Patented July 4, 1939

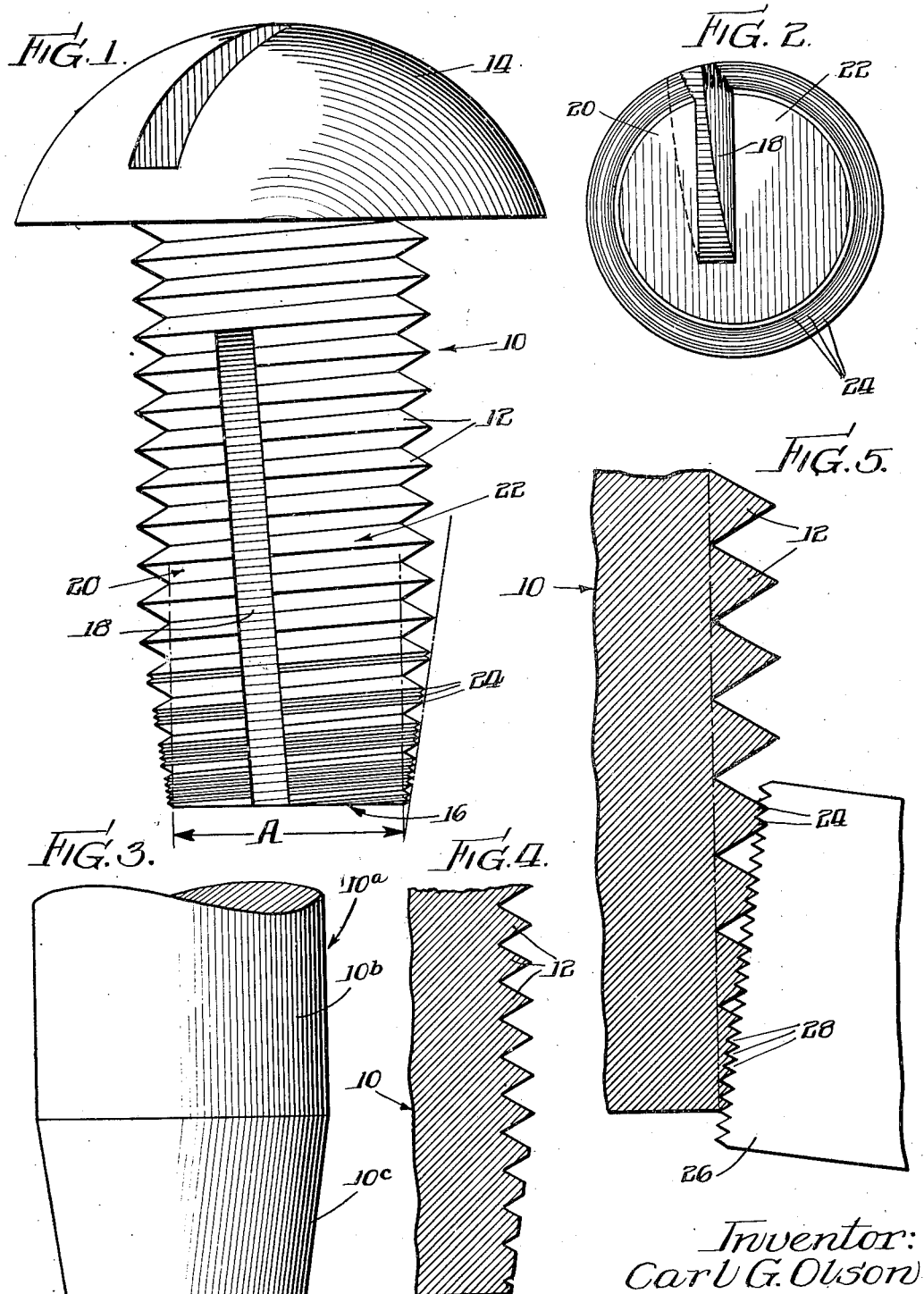

2,165,149

UNITED STATES PATENT OFFICE 2,165,149

TAPPING SCREW AND METHOD OF FORMING SAME

Carl G. Olson, Chicago, Ill., assignor to Illinois Tool Works, Chicago, Ill., a corporation of Illinois Application January 9, 1933, Serial No. 650,835
Renewed January 4, 1936

7 Claims. (Cl. 85—47)

My invention relates to thread-cutting screws adapted to cut their own threads in a work piece of metal or other material too hard to permit the insertion of an ordinary wood screw.

The principal object of my invention is to provide a thread-cutting screw which is capable of easy insertion by means of an ordinary screw driver or the like. I have accomplished this object by providing a headed screw body with a hardened thread which has a tapering entering portion which is so formed and recessed as to provide a serrated cutting edge. I have discovered that the provision of such a cutting edge makes it easy to turn the screw into an unthreaded hole in metal, and overcomes the difficulties heretofore encountered in thread-cutting screws provided with straight cutting edges like those of the conventional tap.

The foregoing and numerous other objects and advantages will be more apparent from the following detailed description when considered in connection with the accompanying drawing, wherein—

Figure 1 is a side elevational view of a screw embodying features of my invention;

Figure 2 is a bottom view of the screw of Figure 1;

Figure 3 discloses a fragmentary portion of the screw blank from which the screw of Figures 1 and 2 may be formed;

Figure 4 discloses the blank after it has been subjected to a conventional thread rolling operation to form the main thread thereon; and Figure 5 is an enlarged fragmentary view similar to Figure 4, disclosing the manner in which the entering end of the screw body is provided with my improved novel leader thread construction.

Referring now to the drawing more in detail wherein like numerals have been employed to designate similar parts throughout the various figures, it will be seen that my invention contemplates the provision of a tapping screw fastener, which includes a screw body designated generally by the numeral 10. This body is formed with a main thread 12 and is provided at one end thereof with a suitable head 14. The thread 12 on the entering part of the screw tapers, decreasing in height and in external diameter and terminating at the entering extremity or end face 16. I prefer to employ a screw structure in which the diameter of the entering end where the main thread terminates is substantially equal to the root diameter of said thread, and this root diameter is indicated by the letter A in Figure 1. This makes the body of the screw of uniform diameter and provides the greatest strength.

Extending longitudinally and partially traversing the threaded body 10 is a slot 18, Figures 1 and 2. This slot preferably extends substantially perpendicular to the thread helix, as indicated in Figure 1, and is positioned to one side of the screw axis whereby to present a screw section 20 of smaller cross sectional area than a companion oppositely disposed screw section 22. It will be apparent that when the screw is applied to an unthreaded aperture of a work piece, the section 20 will yield so as to increase the cutting effectiveness of the serrated edge presented along the opposite section 22. The particular form and position of the portion of the slot 18 within the body of the screw forms a part of the subject-matter of Trotter patents, Nos. 1,862,486, 1,909,476 and 1,909,477 and is, therefore, not claimed herein. For the purposes of the present invention, it is essential only that the slot or recess 18 cut the entering portion of the thread longitudinally of the screw and that its rear surface intersects the entering portion of the thread laterally of the screw at an angle not materially greater than a right angle so that it may cooperate with the entering portion of the thread to provide a serrated cutting edge which will act on a work piece as the screw is turned in.

One of the novel and improved features presented by the present invention is that of providing a leader thread 24 of multiple form which is superimposed upon the tapering or gradually decreasing portion of the main thread 12 at the entering end of the screw body. By providing this leader thread which in cross section presents at the slot 18 a plurality of relatively small serrations of uniform height, screws of relatively large sizes may be applied to a work piece with a minimum amount of effort by the user.

In Figure 3 I have shown a screw blank designated generally by the numeral 10a, upon which threads conforming with the above description may be formed. I prefer to provide the blank with a cylindrical portion 10b and a tapering portion 10c. On the blank may be formed a thread as shown in Figure 4. It will be seen that the section of the thread upon the tapering portion of the blank decreases in height toward the entering end of the screw and has a flat top as in conventional taps, so that it cannot present a serrated cutting edge when longitudinally recessed. The device of Figure 4 may then be subjected to the action of a die 26 shown in Figure 5. This die may be of any suitable form and is provided with a plurality of serrations or teeth 28 which, when properly associated with the peripheral surfaces of the entering threads, will cause the leader threads 24 to be superimposed upon the previously formed main thread. Obviously, in forming the leader threads 24 by the use of the die or tool 26, the screw blank may be rotated and the die moved in an axial direction in conformity with the lead of the thread to be produced. I have disclosed the die 26 in a schematic manner, and it will be understood that the invention is by no means limited to any particular form of die, but contemplates various modifications which, when moved relatively to and in contact with the screw blank, will form leader threads of uniform height thereon.

Furthermore, while I have disclosed a method wherein the blank is first formed with the main thread 12 and thereafter said main thread is superimposed by a die which forms a leader thread, my invention contemplates the simultaneous forming of both the main and leader threads. While the drawing discloses the apices of the leader threads positioned in substantial alinement, as indicated by the inclined dot-and-dash line in Figure 1, it will be apparent that other structural arrangements are contemplated by the invention.

The screw disclosed herein incorporates a standard machine screw thread as distinguished from the conventional coarse pitch wood screw thread. Although the invention is, in its broadest sense, not limited to a standard machine screw thread structure, this feature of the invention is of very practical significance because it enables an internal thread to be cut which is adapted to receive a conventional screw or bolt. In other words, a screw constructed in accordance with the teachings of my invention, after it has been inserted so as to cut its way through the material of the work, may be replaced, if desired, by a standard or conventional machine screw.

It will also be noted that the entering portion of the thread and the slot or recess are so formed that the entering part of the screw is provided with a serrated cutting edge very different from the series of straight cutting edges provided in the entering part of an ordinary tap. Changes and modifications of form which do not eliminate the serrated cutting edge on the entering portion of the screw may be made without departing from the spirit and scope of the present invention.

Having thus described my invention, what I claim as new and desire to secure by Letters Patent is:

1. A tapping screw fastener including a hardened body portion having a thread and formed with a non-burrowing entering extremity, and a smaller multiple leader thread positioned at the entering end of the fastener for increasing the gripping aggressiveness when the screw is initially applied to a work piece, said leader thread being substantially uniform in height throughout the greater portion of its extent, said leader thread being in helical alinement throughout the extent thereof.

2. A thread cutting screw fastener including a body, a head at one end of the body, a hardened thread on the body consisting of a holding portion of uniform external diameter and a thread cutting portion of decreasing external diameter which is longitudinally recessed and includes a plurality of convolutions each having a plurality of V-shaped ridges at the entering end thereof providing a serrated cutting edge along the recess.

3. A thread cutting screw fastener including a body, a head at one end of the body, a hardened thread on the body consisting of a holding portion of uniform external diameter conforming in cross sectional contour with a machine screw type thread and a thread cutting portion of decreasing external diameter which is longitudinally recessed and includes a plurality of convolutions each having a plurality of V-shaped ridges at the entering end thereof providing a serrated cutting edge along the recess.

4. A thread cutting screw fastener including a body of uniform diameter, a head at one end of the body, a hardened thread on the body consisting of a holding portion of uniform height and a thread cutting portion of decreasing height which is longitudinally recessed and includes a plurality of convolutions each having a plurality of V-shaped ridges at the entering end thereof providing a serrated cutting edge along the recess.

5. A thread-cutting screw fastener including a body, a head at one end of the body, a hardened thread of uniform axial pitch on the body consisting of a holding portion of uniform external diameter and a thread-cutting portion of decreasing external diameter which is recessed longitudinally of the screw, the cutting portion of the thread consisting of a plurality of V-shaped ridges, and the recess being so formed that its rear surface intersects said ridges laterally of the screw body at an angle not materially greater than a right angle, so as to provide a serrated cutting edge which will act on a work piece as the fastener is screwed into an unthreaded aperture thereof.

6. A thread-cutting screw fastener including a body of substantially uniform diameter, a head at one end of the body, a hardened thread of uniform axial pitch on the body consisting of a holding portion of uniform height and a thread-cutting portion of decreasing height which is recessed longitudinally of the screw, the cutting portion of the thread consisting of a plurality of V-shaped ridges, and the recess being so formed that its rear surface intersects said ridges laterally of the screw body at an angle not materially greater than a right angle, so as to provide a serrated cutting edge which will act on a work piece as the fastener is screwed into an unthreaded aperture thereof.

7. A thread-cutting screw fastener including a body, a head at one end of the body, a hardened thread of uniform axial pitch on the body consisting of a holding portion of the machine thread type and of uniform external diameter and a thread-cutting portion of decreasing external diameter which is recessed longitudinally of the screw, the cutting portion of the thread consisting of a plurality of V-shaped ridges, and the recess being so formed that its rear surface intersects said ridges laterally of the screw body at an angle not materially greater than a right angle, so as to provide a serrated cutting edge which will act on a work piece as the fastener is screwed into an unthreaded aperture thereof.

CARL G. OLSON.